No. 624,208. Patented May 2, 1899.
A. HAYE.
LIQUID DISPENSING APPARATUS.
(Application filed May 31, 1898.)
(No Model.)
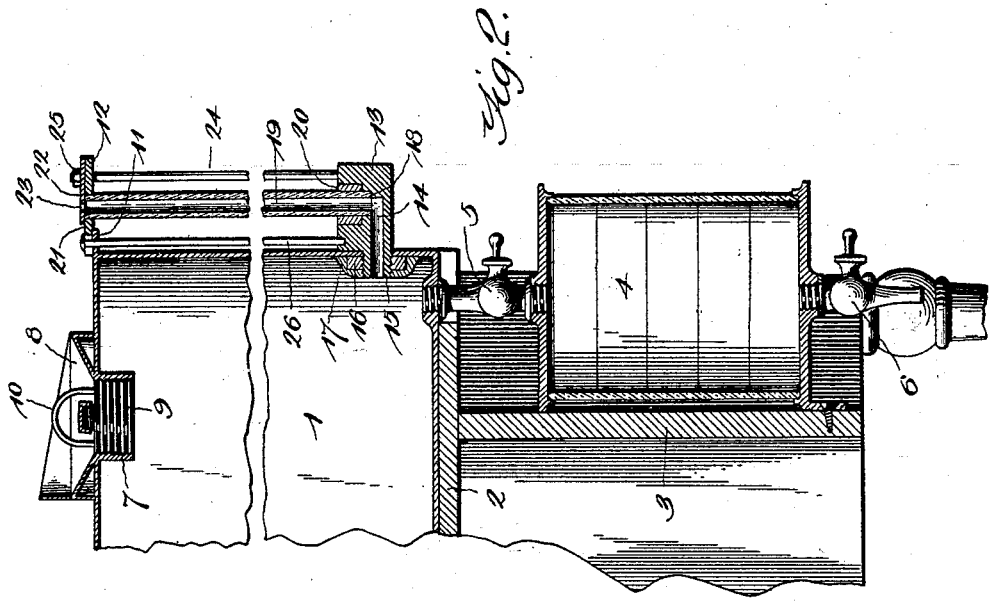
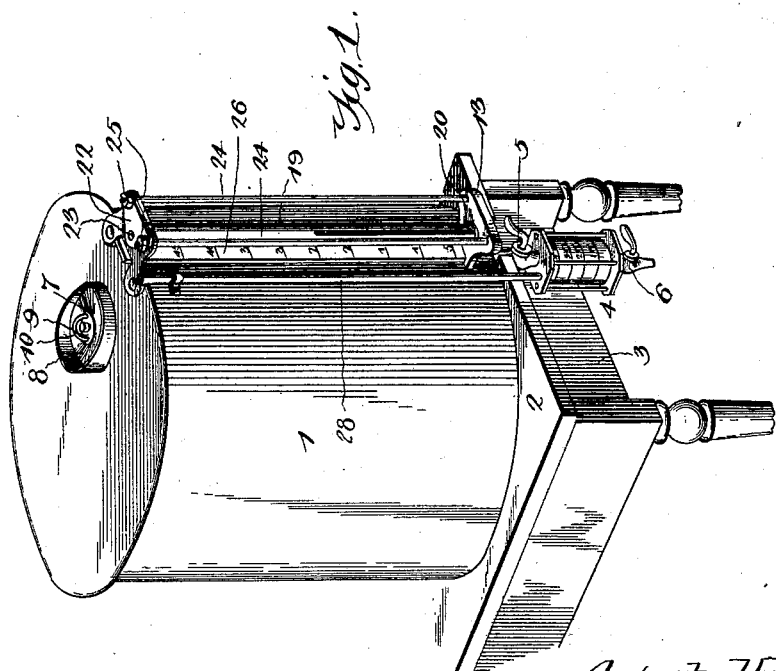
August Haye, Inventor.
Witnesses
By his Attorneys,

# UNITED STATES PATENT OFFICE.

AUGUST HAYE, OF SAN ANTONIO, TEXAS.

LIQUID-DISPENSING APPARATUS.

SPECIFICATION forming part of Letters Patent No. 624,208, dated May 2, 1899.

Application filed May 31, 1898. Serial No. 682,204. (No model.)

*To all whom it may concern:*

Be it known that I, AUGUST HAYE, a citizen of the United States, residing at San Antonio, in the county of Bexar and State of Texas, have invented a new and useful Liquid-Dispensing Apparatus, of which the following is a specification.

My invention relates to an apparatus for dispensing liquids, such as oil, and has for its object to provide a simple and compact construction and arrangement of parts whereby the liquid may be measured as dispensed, large quantities being measured by means of a gage used in connection with and controlled by the contents of the tank and small quantities, as in retail sales, &c., being measured by means of a graduated vessel employed for that purpose and having valved communication with the tank.

A further object of my invention is to provide such a construction of gage for the tank as to indicate accurately the depth and hence the quantity of the contents and to provide such means for holding the gage-tube in place as to facilitate the mounting of the tube to take the place of one which has been broken.

Further objects and advantages of this invention will appear in the following description, and the novel features thereof will be particularly pointed out in the appended claims.

In the drawings, Figure 1 is a perspective view of a dispensing apparatus constructed in accordance with my invention. Fig. 2 is a vertical central section of the same.

Similar numerals of reference indicate corresponding parts in both figures of the drawings.

The tank 1, which is preferably of cylindrical construction, is adapted for support by a suitable frame 2, consisting in the construction illustrated of a table similar to that shown and described in a former patent, No. 604,321, granted to me on May 17, 1898, wherein the front portion of the frame or table-top projects sufficiently beyond the contiguous front bar or skirting-board 3 to accommodate a measuring vessel 4. A valved communicating pipe 5 between the tank and the measuring vessel forms an inlet-faucet, by which a portion of the contents of the tank may be admitted to the measuring vessel when it is desired to dispense the same, and in communication with the measuring vessel at its bottom is an outlet-faucet 6, also of valved construction, whereby after the closing of the inlet-faucet a suitable receptacle may be arranged to receive the contents of the measuring vessel through the outlet-faucet 6. The inlet-faucet, constituting the connecting tube or neck between the tank and the measuring vessel, is arranged in a notch formed in the contiguous front edge of the table, any suitable means being employed for maintaining the parts in the described relative positions. It will be understood that the measuring vessel, which is provided, preferably, with a glass or similar transparent wall, may be suitably graduated to indicate retail measurements, such as pints, quarts, &c.

Communicating with a supply-opening 7 in the top of the tank is a funnel 8, and removably fitted in the supply-opening is a plug or stopper 9. In the construction illustrated the plug is provided with a looped or bail handle 10.

The top of the tank in the construction illustrated is provided with an overhanging exterior flange 11, to which is riveted an upper bracket 12, vertically above a lower bracket 13, which is channeled, as shown at 14, and is provided with a tube 15, communicating with said channel and extending through an opening in the wall of the tank near its bottom. Threaded upon the inwardly-projecting end of the tube 15 is a securing-nut 16, which is adjusted to bear snugly against the inner surface of the tank-wall, and in practice I preferably employ cement to render the joint between said parts perfectly air-tight and incase the nut 16 in solder, as shown at 17, whereby it is prevented from loosening and the joint is still further strengthened. The channel 14 communicates at its outer end with a seat 18, in which is fitted the lower end of a transparent gage-tube 19, a suitable bed 20 of cement being arranged in the seat to prevent leakage without obstructing the communication between the channel 14 and the bore of the tube. The upper end of the gage-tube is fitted in an opening 21 in the upper bracket 12, said tube being inserted downwardly through said opening 21 in order to introduce it at its lower end into the seat 18, and vertical displacement of the tube is prevented by means of a securing-plate 22, which is provided in alinement with the bore of the tube with a vent 23 of small diameter, whereby as liquid rises in the gage-tube the air in the latter is allowed to escape, thus maintaining the surface of the liquid in the tube in the same plane with that in the tank.

Connecting the brackets 12 and 13 are vertical tie-rods 24, threaded at their lower ends in the bracket 13 and engaged at their upper ends above the plane of the bracket 12 by nuts 25. These upper extremities of the tie-rods and the nuts 25 are utilized as the means of securing the plate 22 in place, and hence locking the gage-tube in its terminal seats in the brackets, the plate being provided with openings to receive the extremities of the tie-rods and being held parallel and in contact with the upper bracket by means of the nuts. Also terminally secured to the upper and lower brackets is a graduated plate or scale 26, whereon the graduations indicate liquid measurements, such as gallons.

Communicating with a vent-opening in the top of the measuring vessel is a vent-tube 28, which extends vertically to a point contiguous to the plane of the upper end of the gage-tube, whereby in case of accidental or careless opening of the inlet-faucet 5 and the overfilling of the measuring vessel the liquid will rise in the vent-tube until it reaches the level of the contents of the tank. Thus there can be no overflow from the measuring vessel by reason of providing therein a vent to allow the escape of air during the filling of said vessel.

The operation of the apparatus will be obvious. As the liquid is introduced through the supply-opening in the top of the tank, the rise thereof in the gage-tube will indicate the amount introduced, and the relief of air above the liquid in the gage-tube will allow the unobstructed communication of the liquid to the tube, and hence the accurate indication in the tube of the depth of the liquid. When it is desired to withdraw a definite quantity of the contents of the tank, the upper or inlet faucet is opened, and when the desired quantity of liquid has flowed from the tank into the measuring vessel said inlet-faucet is closed and the outlet-faucet opened to allow the contents of said vessel to flow into a receptacle provided for the purpose.

Various changes in the form, proportion, and the minor details of construction may be resorted to without departing from the spirit or sacrificing any of the advantages of this invention.

Having described my invention, what I claim is—

1. A dispensing apparatus for liquids having a tank, upper and lower brackets secured to the tank and provided with registering seats, the lower bracket being provided with a channel connecting its seat with the interior of the tank, tie-rods connecting the brackets, a gage-tube fitted in said registering seats, and a securing-plate engaged and held in place by the upper ends of the tie-rods, and covering the upper end of the gage-tube to hold the latter seated, said securing-plate being provided with a vent in registration with the bore of the tube, substantially as specified.

2. In a dispensing apparatus for liquids, the combination with a tank, of upper and lower brackets provided with vertically-registering seats, the lower bracket having a tube extending through an opening in the wall of the tank and engaged by a nut in contact with the inner surface of said wall, the bore of the tube being in communication by a channel with the seat in the lower bracket, tie-rods connecting said brackets, a gage-tube fitted terminally in the seats of the brackets with its upper end flush with the upper surface of the upper bracket, nuts threaded upon the upper extremities of the tie-rods, and a securing-plate having openings fitted upon the upper ends of the tie-rods and engaged by said nuts, the securing-plate extending over the upper end of the gage-tube and provided in registration with the bore of said tube, with a vent, substantially as specified.

3. As an article of manufacture, a vent and gage attachment for the tank of a liquid-dispensing apparatus, the same consisting of spaced upper and lower brackets provided with means for attachment to a tank and having registering seats, a tube attached to the lower bracket with its bore in communication with the seat therein, the upper seat being open-ended, tie-rods connecting said brackets, a gage-tube terminally fitted in the seats of the bracket, and adapted for insertion through said upper seat, a securing-plate on the upper bracket for engagement with to maintain the gage-tube seated, and having a vent-opening in registration with the bore of the gage-tube, and a gage plate or scale arranged parallel with said tube and connecting and terminally secured to the brackets, substantially as specified.

In testimony that I claim the foregoing as my own I have hereto affixed my signature in the presence of two witnesses.

AUGUST HAYE.

Witnesses:
 AXEL MEERSCHEIDT,
 C. A. STIEREN.